(12) United States Patent
Shimizu

(10) Patent No.: US 8,310,617 B2
(45) Date of Patent: Nov. 13, 2012

(54) LIQUID CRYSTAL DISPLAY DEVICE

(75) Inventor: Shinji Shimizu, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 198 days.

(21) Appl. No.: 12/868,009

(22) Filed: Aug. 25, 2010

(65) Prior Publication Data

US 2011/0051033 A1 Mar. 3, 2011

(30) Foreign Application Priority Data

Aug. 25, 2009 (JP) .................. 2009-193931

(51) Int. Cl.
*G02F 1/1333* (2006.01)

(52) U.S. Cl. ......................... 349/58

(58) Field of Classification Search ............ 349/58
See application file for complete search history.

(56) References Cited

U.S. PATENT DOCUMENTS 7,113,237 B2 *  9/2006  Nitto et al. ............... 349/58
7,234,945 B2     6/2007  Azuma et al.

FOREIGN PATENT DOCUMENTS

JP     2007-140271     6/2007

* cited by examiner

*Primary Examiner* — James Dudek
(74) *Attorney, Agent, or Firm* — Antonelli, Terry, Stout & Kraus, LLP.

(57) ABSTRACT

A liquid crystal display device includes: a liquid crystal display panel having a liquid crystal layer disposed between substrates facing each other; and a supporting frame holding the liquid crystal display panel and capable of being attached to backlight means, wherein an optical sheet disposed on the backlight means side of the liquid crystal display panel is provided, the supporting frame includes an upper frame, a mold frame, and a lower frame, the upper frame and the mold frame sandwiching the liquid crystal display panel therebetween, the mold frame and the lower frame sandwiching the optical sheet therebetween, and first fixing means (including a screw) for fixedly coupling the upper frame, the mold frame, and the lower frame with one another and second fixing means (including a screw) for fixedly coupling only the lower frame with the backlight means are separately disposed.

14 Claims, 3 Drawing Sheets

LIQUID CRYSTAL DISPLAY DEVICE

CROSS-REFERENCE TO RELATED APPLICATION

The present application claims priority from Japanese application JP 2009-193931 filed on Aug. 25, 2009, the content of which is hereby incorporated by reference into this application.

BACKGROUND OF THE INVENTION

1. Field of the Invention

The present invention relates to a liquid crystal display device and more particularly to a liquid crystal display device having a supporting frame which holds a liquid crystal display panel and optical sheets and with which the held liquid crystal display panel and the held optical sheets can be attached and detached to and from a backlight which is disposed separately.

2. Description of the Related Art

A liquid crystal display device includes a liquid crystal display panel having a liquid crystal layer disposed between two substrates facing each other and a backlight irradiating the rear surface of the liquid crystal display panel with light. As shown in JP-A-2007-140271 and its corresponding U.S. Pat. No. 7,234,945, in the liquid crystal display device, the liquid crystal display panel and the backlight are integrally incorporated by using an upper frame, a lower frame, and a mold frame serving as a supporting member.

On the other hand, in broadcasting or business monitors used in broadcasting services for example, high display quality is demanded in view of resolution, color reproducibility, contrast, brightness, uniformity of contrast, and the like. Accordingly, in broadcasting or business monitors, the liquid crystal display device in which the liquid crystal display panel and the optical sheets are assembled as a module, and backlight means (light source) are formed separately, and they are configured so as to be attachable and detachable to and from each other. With this configuration, even when a failure has occurred, or parts or the product needs replacement in one of the liquid crystal display device (module in which the liquid crystal display panel and the optical sheets are assembled) and the backlight means (light source), it is enough to replace only one of them. This makes it possible to suppress an increase in cost for replacement or repair and to maintain the product at high quality.

SUMMARY OF THE INVENTION

However, when the liquid crystal display device holding the liquid crystal display panel is combined with the backlight means, excessive stress or external force is applied to the peripheral portion of the liquid crystal display panel, causing the occurrence of display unevenness. Moreover, when the optical sheet for unifying illumination light from the backlight means is incorporated into the liquid crystal display device side, the number of members constituting the supporting frame increases. Therefore, when the liquid crystal display device is assembled, or the liquid crystal display device is combined with the backlight means, there is a high possibility that more various kinds of stresses or external forces are applied to the liquid crystal display panel.

FIG. 1 is a cross-sectional view showing an exemplary liquid crystal display device. A liquid crystal display panel LCP has two substrates SUB configured of a transparent material such as glass or plastic. On the substrates SUB, color filters, pixel electrodes, thin film transistors serving as switching elements, and the like are formed corresponding to display pixels. A liquid crystal layer is disposed between the two substrates SUB facing each other. Further, a polarizer PO is disposed on the outer surface of each of the substrates SUB.

On a rear surface side (backlight means (light source) side disposed separately from the liquid crystal display device of the invention) of the liquid crystal display panel LCP, an optical sheet OS formed of a diffuser sheet, a prism sheet, and the like is disposed, which contributes to the uniformity and focusing of illumination light of the backlight means. For holding the liquid crystal display panel LCP and the optical sheet OS, an upper frame UFR and a lower frame SFR which are made of metal and a mold frame MFR which is made of resin constitute a supporting frame.

The liquid crystal display panel LCP is sandwiched between the upper frame UFR and the mold frame MFR. The optical sheet OS is sandwiched between the mold frame MFR and the lower frame SFR. For preventing excessive stress from being applied to the liquid crystal display panel or preventing the liquid crystal display panel from being damaged, a cushion tape CT or the like is disposed between the respective frames at the peripheral portion of the liquid crystal display panel. The cushion tape is also disposed for the optical sheet OS between the respective frames if needed.

The liquid crystal display device shown in FIG. 1 is attached for use to backlight means disposed separately from the liquid crystal display device of the invention. As shown in FIG. 2, backlight means BL includes a light source LED such as, for example, a light-emitting diode (LED) or a cold-cathode tube (CCFL) accommodated in a frame BFR for backlight. A reflective member or the like is disposed between the light source LED and the frame BFR if needed. When the liquid crystal display device is combined with the backlight means BL, a screw SC is utilized to fixedly couple the supporting frame of the liquid crystal display device to the frame BFR of the backlight means.

As described above, however, the supporting frame is not a single member but includes a plurality of members such as the upper frame UFR, the mold frame MFR, and the lower frame SFR. When the members of the supporting frame are fixed together, or the supporting frame is fixed to the backlight means BL by the screw as shown in FIG. 2, load by the screw is applied to the upper frame UFR, the mold frame MFR, and the lower frame SFR, which deforms the frames and in particular may cause the application of excessive stress also to the peripheral portion of the liquid crystal display panel LCP or nonuniformity of force sandwiching the liquid crystal display panel. These are the causes of display unevenness of the liquid crystal display panel, resulting in a fatal defect especially when the liquid crystal display device is used as a monitor providing a high quality display.

For solving the above-described problem, it is an object of the invention to provide a liquid crystal display device in which a liquid crystal display panel and an optical sheet can be reliably held, and the application of excessive stress to the liquid crystal display panel and the like is suppressed when the liquid crystal display device is assembled or the liquid crystal display device is combined with the backlight means to thereby reduce display unevenness.

For solving the above-described problem, the display device of the invention has the following features.

(1) A liquid crystal display device includes: a liquid crystal display panel having a liquid crystal layer disposed between a pair of substrates facing each other; an optical sheet disposed so as to face a surface of the liquid crystal display panel on the opposite side from a display surface; and a supporting frame formed of a plurality of members holding the liquid crystal display panel and the optical sheet, wherein the supporting frame includes at least an upper frame, a mold frame disposed inside the upper frame, and a lower frame disposed inside the mold frame, the upper frame covers the liquid crystal display panel and exposes the display surface of the liquid crystal display panel, the mold frame is formed in a frame shape and has a protruding portion at which the liquid crystal display panel is disposed, the liquid crystal display panel is sandwiched between the protruding portion of the mold frame and the upper frame, the optical sheet is sandwiched between the protruding portion of the mold frame and the lower frame, a drawn part protruding to a side surface side of the upper frame is formed on a side surface of the lower frame, a screw hole is formed in the drawn part, an opening through which the drawn part penetrates is formed in a side surface of the mold frame, a small hole facing the screw hole and the opening and smaller than the opening is formed in a side surface of the upper frame, and the upper frame and the lower frame are fixed to each other by a screw inserted into the small hole and the screw hole.

(2) In the liquid crystal display device according to (1), the side surface of the lower frame has a first hole at a position different from the drawn part, the side surface of the mold frame has a second hole at a position facing the first hole, the side surface of the upper frame has a third hole at a position facing the second hole, and the first hole is smaller than the second hole and the third hole.

(3) In the liquid crystal display device according to (1) or (2), the mold frame is formed of resin.

(4) In the liquid crystal display device according to (1) to (3), the upper frame and the lower frame are formed of metal.

(5) A liquid crystal display device includes: a liquid crystal display panel having a liquid crystal layer disposed between substrates facing each other; and a supporting frame holding the liquid crystal display panel and capable of being attached to backlight means, wherein an optical sheet disposed on the backlight means side of the liquid crystal display panel is provided, the supporting frame includes an upper frame, a mold frame, and a lower frame, the upper frame and the mold frame sandwiching the liquid crystal display panel therebetween, the mold frame and the lower frame sandwiching the optical sheet therebetween, and first fixing means for fixedly coupling the upper frame, the mold frame, and the lower frame with one another and second fixing means for fixedly coupling only the lower frame with the backlight means are separately disposed.

(6) In the liquid crystal display device according to (5), the first fixing means includes a fixing drawn part formed by protruding the lower frame to the upper frame side and formed with a screw hole serving as a female screw in the protruding portion, an opening through which the fixing drawn part penetrates and which is formed in the mold frame, a small hole formed in the upper frame, and a screw inserted from the small hole of the upper frame to be threadably engaged with the screw hole for fixing the fixing drawn part with the upper frame.

(7) In the liquid crystal display device according to (6), a tip of the screw which is threadably engaged with the screw hole is configured so as not to protrude from an inner space formed by the fixing drawn part to a position in contact with the backlight means.

(8) In the liquid crystal display device according to (5), the second fixing means fixedly couples the lower frame with the backlight means by a screw, and an opening through which a screw head of the screw can penetrate is formed in the upper frame and the mold frame.

(9) In the liquid crystal display device according to any of (5) to (8), a raised portion is disposed at a part of the lower end of the lower frame for performing the alignment between the lower frame and the backlight means or between the lower frame and the upper frame or the mold frame.

According to the invention, since the first fixing means for fixing the members constituting the supporting frame of the liquid crystal display device and the second fixing means for fixing the liquid crystal display device to the backlight means are separately disposed, and especially the second fixing means fixedly couples only the lower frame constituting the supporting frame with the backlight means, excessive stress is not applied to the liquid crystal display panel and the like when the liquid crystal display device is assembled or the liquid crystal display device is combined with the backlight means. Therefore, it is possible to suppress the occurrence of display unevenness of the liquid crystal display device.

DESCRIPTION OF THE PREFERRED EMBODIMENTS

Figure 1:
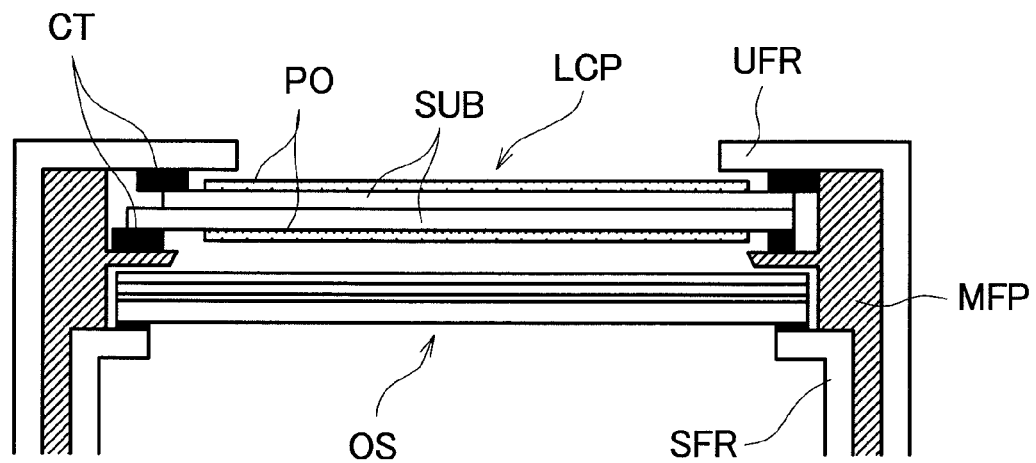
FIG. 1 is a cross-sectional view schematically showing a liquid crystal display device.

A liquid crystal display device according to the invention will be described in detail below. The invention can be suitably used for a liquid crystal display device having a liquid crystal display panel LCP having a liquid crystal layer disposed between substrates SUB facing each other and a supporting frame holding the liquid crystal display panel and capable of being attached and detached to and from backlight means as shown in FIG. 1. Especially when the supporting frame includes a plurality of members, such as an upper frame UFR, a mold frame MFR, and a lower frame SFR, as in the case of including an optical sheet OS disposed on the backlight means side of the liquid crystal display panel LCP, the invention can be more suitably utilized.

As shown in FIG. 1, the liquid crystal display panel LCP is sandwiched between the upper frame UFR and the mold frame MFR. The optical sheet OS is sandwiched between the mold frame MFR and the lower frame SFR. Further, a cushion tape CT is disposed between the liquid crystal display panel LCP and the upper frame UFR or the mold frame MFR, so that the liquid crystal display panel can be more reliably held without putting excessive stress on the liquid crystal display panel.

The material of the members constituting the supporting frame is not particularly limited. However, the upper frame UFR and the lower frame SFR are preferably made of metal, and the mold frame MFR is preferably made of resin. For example, a frame shape corresponding to a fine outer shape of the liquid crystal display panel LCP and the optical sheet OS is formed with the resin mold frame MFR, the liquid crystal display panel LCP and the like are accommodated in the mold frame MFR, and the liquid crystal display panel LCP and the like are pressed to the mold frame MFR side by the metal upper frame UFR or the metal lower frame SFR. Thus, the liquid crystal display panel and the like can be more reliably held.

Figure 2:
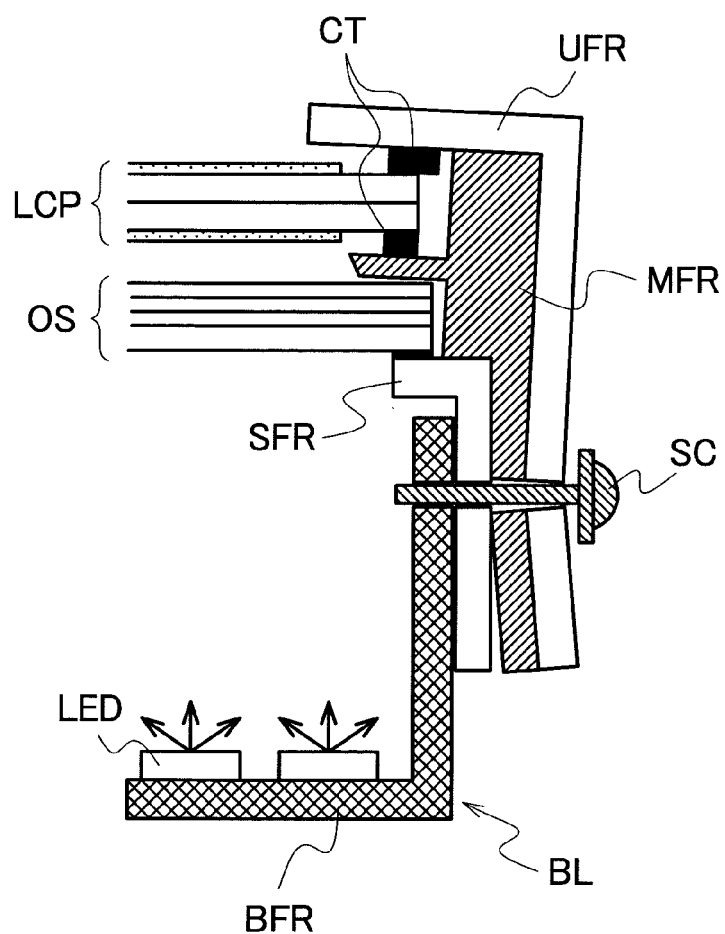
FIG. 2 explains the assembled state of a conventional liquid crystal display device and backlight means.
Figure 3:
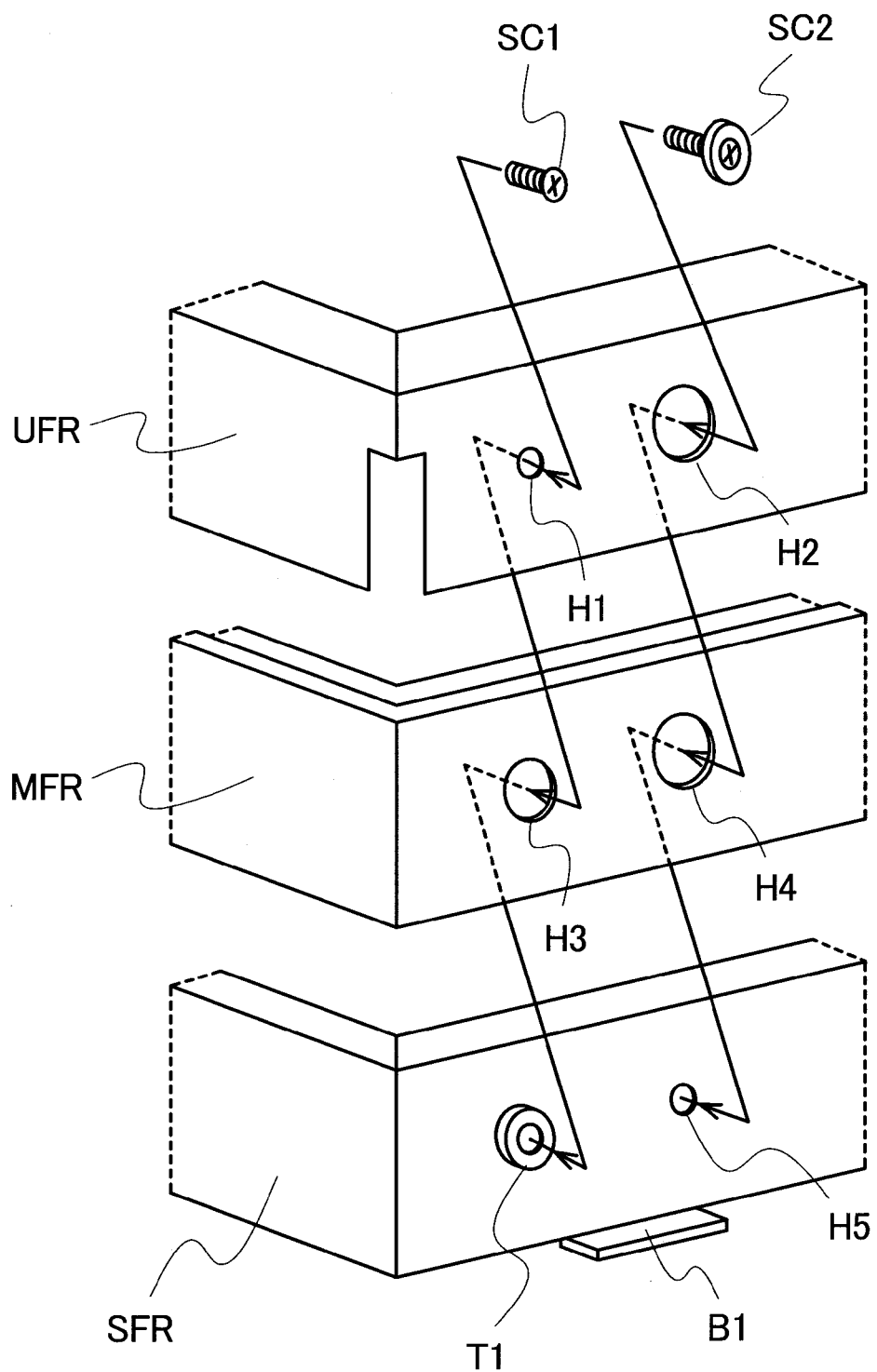
FIG. 3 explains a fixing method of a supporting frame and the like according to a liquid crystal display device of the invention.

FIG. 3 explains a fixing method of the upper frame UFR, the mold frame MFR, and the lower frame SFR which constitute the supporting frame. In general, since side surfaces of the frames are disposed so as to overlap with one another, a clearance of about from 0.1 mm to 0.5 mm is ensured between the respective parts. As shown in FIG. 2, the clearance is easily narrowed when the frames are fixedly coupled by a screw or the like, sometimes causing the deformation of the frames.

A main feature of the liquid crystal display device of the invention resides in that for the upper frame UFR, the mold frame MFR, and the lower frame SFR which constitute the supporting frame, first fixing means for fixedly coupling the upper frame UFR, the mold frame MFR, and the lower frame SFR with one another and second fixing means for fixedly coupling only the lower frame SFR with backlight means BL are provided separately from each other as fixing means.

The first fixing means will be described by using FIGS. 3 and 4. On the lower frame SFR constituting a part of the first fixing means, a fixing drawn part T1 is formed. The fixing drawn part T1 is formed by protruding a part of the side wall of the lower frame SFR to the upper frame UFR side, and formed with a screw hole serving as a female screw in the protruding part. In the mold frame MFR constituting a part of the first fixing means, an opening H3 through which the fixing drawn part T1 penetrates is formed. In the upper frame UFR constituting apart of the first fixing means, a small hole H1 is formed.

Figure 4:
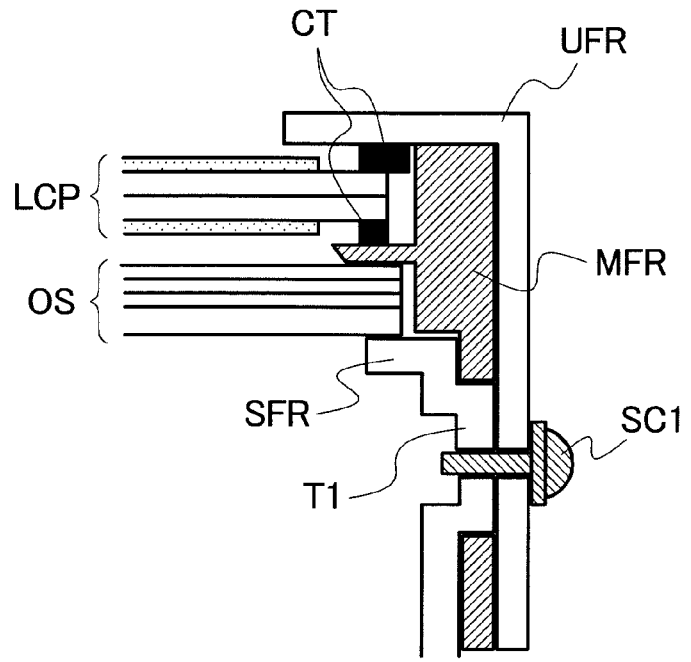
FIG. 4 explains the fixed status by means of first fixing means according to the liquid crystal display device of the invention.

As shown in FIG. 4, the fixing drawn part T1 of the lower frame SFR penetrates through the opening H3 of the mold frame MFR, thereby fixedly disposing the mold frame MFR to the lower frame SFR at a proper position. The fixing drawn part T1 and the upper frame UFR are disposed so as to directly face each other, and a screw SC1 is inserted from the small hole H1 of the upper frame UFR to be threadably engaged with the screw hole formed in the fixing drawn part T1. Therefore, the lower frame SFR, the upper frame UFR, and the mold frame MFR sandwiched between the lower frame SFR and the upper frame UFR can be fixedly coupled with one another.

At the coupled portion of the lower frame SFR and the upper frame UFR, the fixing drawn part T1 and the upper frame UFR directly face each other. Therefore, another member does not intervene, and they can be disposed properly only with a clearance therebetween. Accordingly, each of the members is not greatly deformed when they are fixedly coupled due to a plurality of clearances in a conventional case. As shown in FIGS. 1 and 2, the liquid crystal display panel LCP is disposed at a protruding portion (portion protruding in a direction parallel to a main surface of the liquid crystal display panel LCP) of the mold frame MFR. As described above, the first fixing means fixes the lower frame SFR with the upper frame UFR without intervention of the mold frame MFR. Therefore, the deformation of the mold frame MFR, or stress or external force applied to the mold frame MFR can be greatly reduced compared to a conventional fixing method. Accordingly, stress or external force applied to the liquid crystal display panel LCP disposed at the protruding portion of the mold frame MFR can also be greatly reduced, so that display unevenness can be prevented.

As shown in FIG. 4, a tip of the screw SC1 is threadably engaged with the screw hole of the fixing drawn part T1, and there is a possibility that a part of the tip protrudes inside the lower frame SFR. In this case, it is preferable to set the protruding amount of the screw such that the tip of the screw SC1 is contained in the inner space formed by the fixing drawn part T1 and to configure the tip of the screw SC1 so as not to protrude to a position in contact with the backlight means disposed inside the lower frame SFR. With this configuration, when the liquid crystal display device is combined with the backlight means, the interference of a frame BFR of the backlight means with the tip of the screw SC1 is prevented.

Next, the second fixing means will be described by using FIGS. 3 and 5. The second fixing means fixedly couples the lower frame SFR with the frame BFR of the backlight means BL by a screw SC2. A small hole H5 into which the screw SC2 is inserted is formed in the lower frame SFR. A position at which the lower frame is fixed to the backlight means by the screw SC2 may be any position as long as it is on the side surface of the lower frame. However, the supporting frame is fixed to the backlight means more preferably at a portion of the side surface where the lower frame, the mold frame, and the upper frame are overlapped with one another than at a position near the lower end of the lower frame or a position outside the upper frame or the mold frame. By disposing the fixing position at the portion where the members constituting the supporting frame are overlapped with one another, the entire liquid crystal display device can be more integrally fixed to the backlight means, and therefore the impact resistance or vibration resistance of the entire liquid crystal display device can be improved.

In the liquid crystal display device of the invention, therefore, openings H2 and H4 through which a screw head of the screw SC2 can penetrate are formed as the second fixing means in the upper frame UFR and the mold frame MFR. In addition, since the upper frame and the mold frame are not fixedly coupled by the screw SC2 because of the openings, the deformation of the members is suppressed. Therefore, excessive stress or external force is not applied to the liquid crystal display panel and the like.

Figure 5:
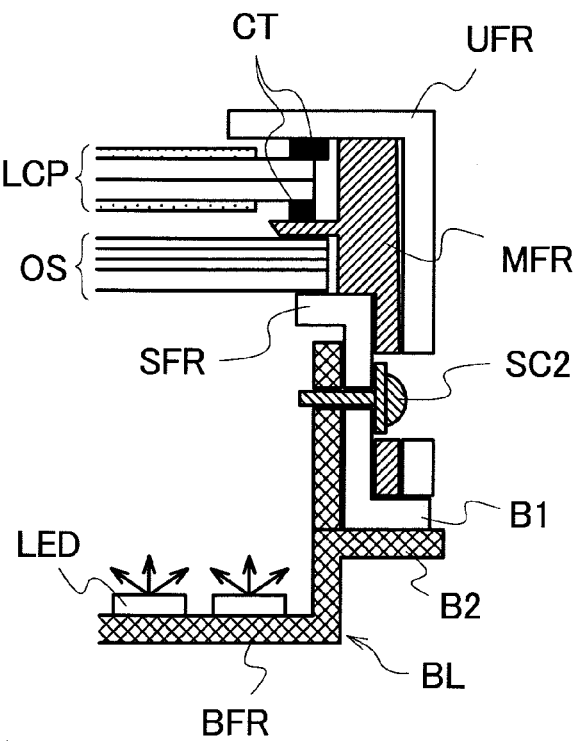
FIG. 5 explains the fixed status by means of second fixing means according to the liquid crystal display device of the invention.

Further in the liquid crystal display device of the invention, as shown in FIGS. 3 and 5, a raised portion B1 may be disposed at a part of the lower end of the lower frame SFR for facilitating the alignment between the lower frame SFR and the backlight means BL or the alignment between the lower frame SFR and the upper frame UFR or the mold frame MFR.

In the alignment between the lower frame SFR and the backlight means BL, a raised portion B2 is formed similarly on the frame BFR of the backlight means BL, so that the positioning of the lower frame and the backlight means can be performed by abutting the raised portion B2 on the raised portion B1 of the lower frame.

In the alignment between the lower frame SFR and the upper frame UFR or the mold frame MFR, the positioning of the members can be performed by abutting the lower end of the upper frame or the mold frame on the raised portion B1.

According to the invention as described above, it is possible to provide the liquid crystal display device in which the liquid crystal display panel and the optical sheet can be reliably held, and the application of excessive stress and external force to the liquid crystal display panel and the like is suppressed when the liquid crystal display device is assembled or the liquid crystal display device is combined with the backlight means to thereby reduce display unevenness.

What is claimed is:
1. A liquid crystal display device comprising:
   a liquid crystal display panel having a liquid crystal layer disposed between a pair of substrates facing each other;
   an optical sheet disposed so as to face a surface of the liquid crystal display panel on the opposite side from a display surface; and
   a supporting frame formed of a plurality of members holding the liquid crystal display panel and the optical sheet, wherein the supporting frame includes at least an upper frame, a mold frame disposed inside the upper frame, and a lower frame disposed inside the mold frame, the upper frame covers the liquid crystal display panel and exposes the display surface of the liquid crystal display panel, the mold frame is formed in a frame shape and has a protruding portion at which the liquid crystal display panel is disposed, the liquid crystal display panel is sandwiched between the protruding portion of the mold frame and the upper frame, the optical sheet is sandwiched between the protruding portion of the mold frame and the lower frame, a drawn part protruding to a side surface side of the upper frame is formed on a side surface of the lower frame, a screw hole is formed in the drawn part, an opening through which the drawn part penetrates is formed in a side surface of the mold frame, a small hole facing the screw hole and the opening and smaller than the opening is formed in a side surface of the upper frame, and the upper frame and the lower frame are fixed to each other by a screw inserted into the small hole and the screw hole.

2. The liquid crystal display device according to claim 1, wherein the side surface of the lower frame has a first hole at a position different from the drawn part, the side surface of the mold frame has a second hole at a position facing the first hole, the side surface of the upper frame has a third hole at a position facing the second hole, and the first hole is smaller than the second hole and the third hole.

3. The liquid crystal display device according to claim 1, wherein the mold frame is formed of resin.

4. The liquid crystal display device according to claim 2, wherein the mold frame is formed of resin.

5. The liquid crystal display device according to claim 1, wherein the upper frame and the lower frame are formed of metal.

6. The liquid crystal display device according to claim 2, wherein the upper frame and the lower frame are formed of metal.

7. The liquid crystal display device according to claim 3, wherein the upper frame and the lower frame are formed of metal.

8. The liquid crystal display device according to claim 4, wherein the upper frame and the lower frame are formed of metal.

9. A liquid crystal display device comprising:

a liquid crystal display panel having a liquid crystal layer disposed between substrates facing each other; and a supporting frame holding the liquid crystal display panel and capable of being attached to backlight means, wherein an optical sheet disposed on the backlight means side of the liquid crystal display panel is provided, the supporting frame includes an upper frame, a mold frame, and a lower frame, the upper frame and the mold frame sandwiching the liquid crystal display panel therebetween, the mold frame and the lower frame sandwiching the optical sheet therebetween, first fixing means for fixedly coupling the upper frame, the mold frame, and the lower frame with one another and second fixing means for fixedly coupling only the lower frame with the backlight means are separately disposed, and the first fixing means includes a fixing drawn part formed by protruding the lower frame to the upper frame side and formed with a screw hole serving as a female screw in the protruding portion, an opening through which the fixing drawn part penetrates and which is formed in the mold frame, a small hole formed in the upper frame, and a screw inserted from the small hole of the upper frame to be threadably engaged with the screw hole for fixing the fixing drawn part with the upper frame.

10. The liquid crystal display device according to claim 9, wherein a tip of the screw which is threadably engaged with the screw hole is configured so as not to protrude from an inner space formed by the fixing drawn part to a position in contact with the backlight means.

11. A liquid crystal display device comprising:

a liquid crystal display panel having a liquid crystal layer disposed between substrates facing each other; and a supporting frame holding the liquid crystal display panel and capable of being attached to backlight means, wherein an optical sheet disposed on the backlight means side of the liquid crystal display panel is provided, the supporting frame includes an upper frame, a mold frame, and a lower frame, the upper frame and the mold frame sandwiching the liquid crystal display panel therebetween, the mold frame and the lower frame sandwiching the optical sheet therebetween, first fixing means for fixedly coupling the upper frame, the mold frame, and the lower frame with one another and second fixing means for fixedly coupling only the lower frame with the backlight means are separately disposed, the second fixing means fixedly couples the lower frame with the backlight means by a screw, and an opening through which a screw head of the screw can penetrate is formed in the upper frame and the mold frame.

12. The liquid crystal display device according to claim 9, wherein a raised portion is disposed at a part of the lower end of the lower frame for performing the alignment between the lower frame and the backlight means or between the lower frame and the upper frame or the mold frame.

13. The liquid crystal display device according to claim 10, wherein a raised portion is disposed at a part of the lower end of the lower frame for performing the alignment between the lower frame and the backlight means or between the lower frame and the upper frame or the mold frame.

14. The liquid crystal display device according to claim 11, wherein a raised portion is disposed at a part of the lower end of the lower frame for performing the alignment between the lower frame and the backlight means or between the lower frame and the upper frame or the mold frame.

* * * * *